June 25, 1968     H. F. RUSSELL     3,389,414
AUTOMATIC MEAT HANDLING AND CLEANING MACHINE
Filed Sept. 30, 1966     3 Sheets-Sheet 1
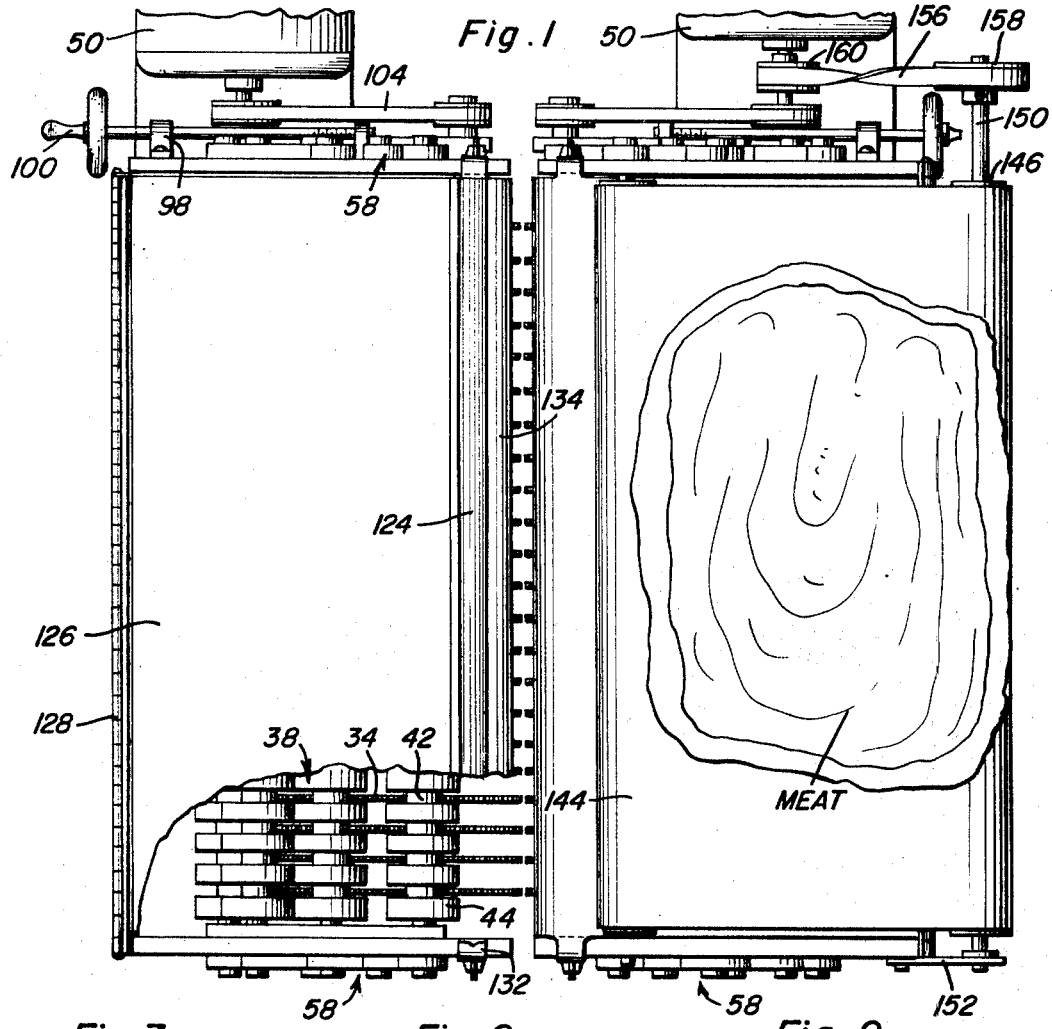
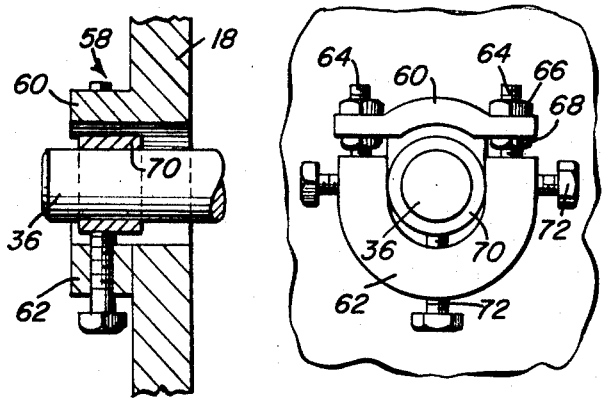
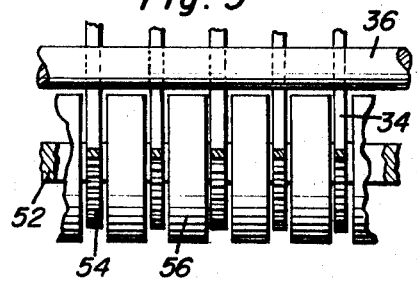
Herman F. Russell
INVENTOR.

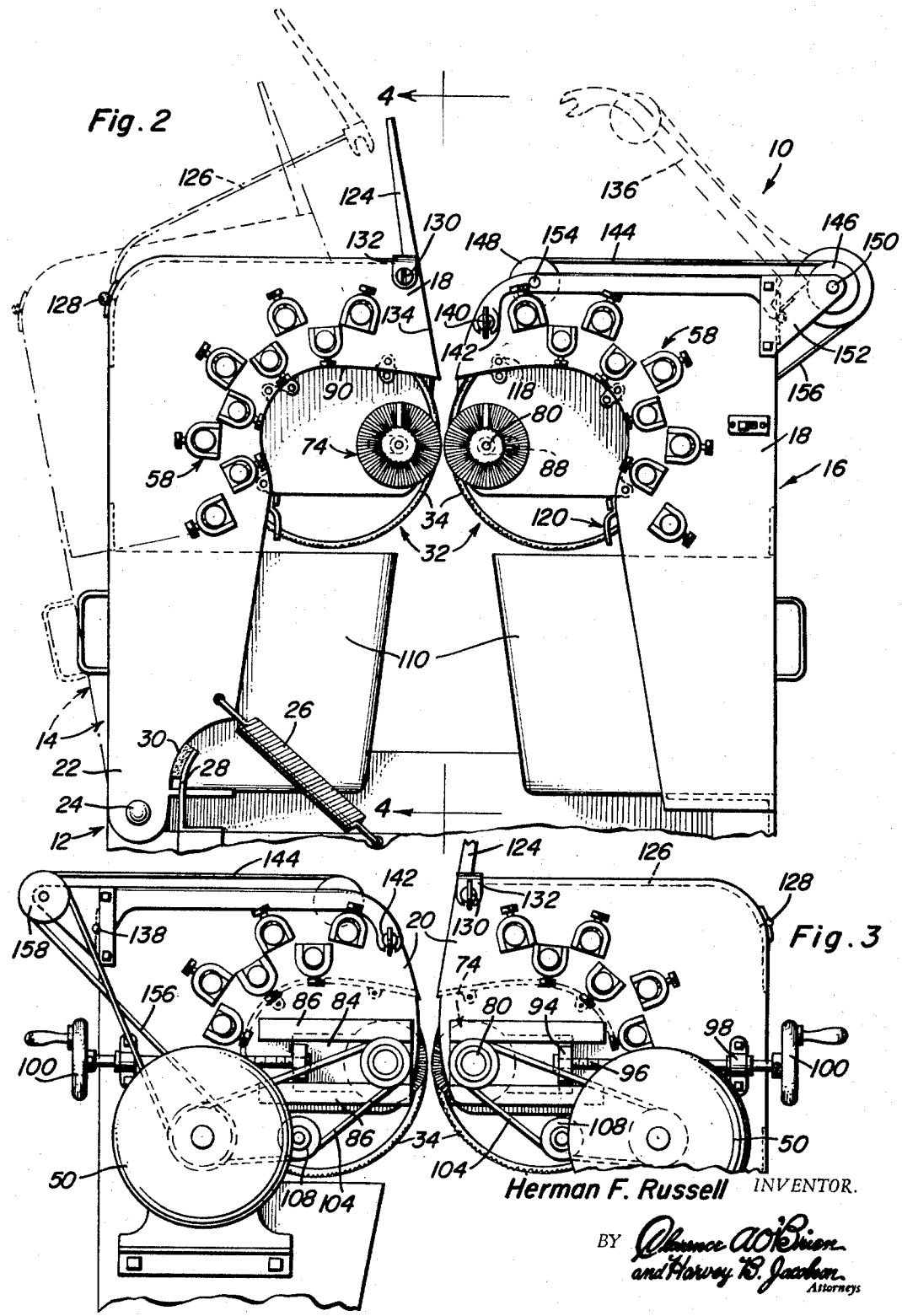

June 25, 1968 H. F. RUSSELL 3,389,414
AUTOMATIC MEAT HANDLING AND CLEANING MACHINE
Filed Sept. 30, 1966 3 Sheets-Sheet 3
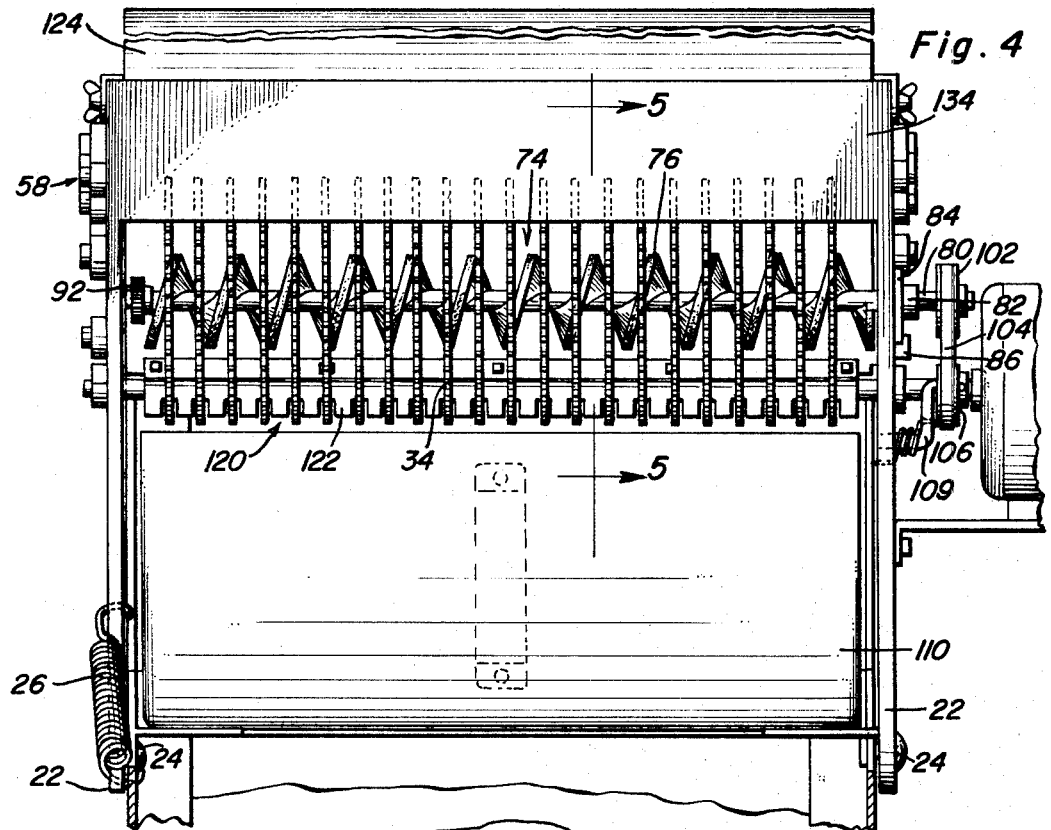
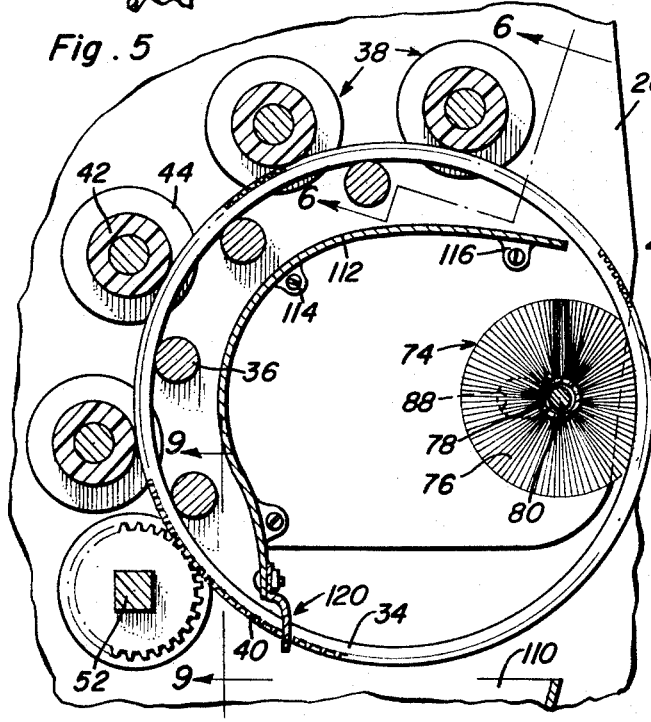
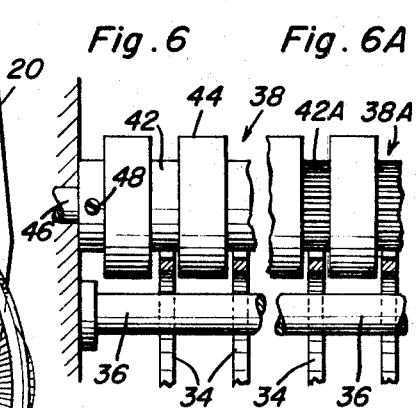
Herman F. Russell
INVENTOR.

3,389,414
AUTOMATIC MEAT HANDLING AND
CLEANING MACHINE
Herman F. Russell, 13900 Cherrylawn St.,
Detroit, Mich. 48238
Filed Sept. 30, 1966, Ser. No. 583,206
15 Claims. (Cl. 15—3.17)

This invention generally relates to the preparation of cuts of meat, and is more particularly concerned with a machine which operates so as to, upon receiving a cut of meat, automatically clean the opposed surfaces of the meat, removing bone dust, marrow, meat particles and the like, so as to present a clean salable product.

It is a primary object of the instant invention to provide a machine which is capable of receiving cuts of meat, regardless of the thickness thereof, and effectively grip the meat and move the meat along a predetermined path while simultaneously effecting a thorough cleaning of the opposed surfaces thereof, the meat subsequently being discharged in a suitable meat lug or the like.

In conjunction with the above object, it is a highly significant object of the instant invention to provide a machine which is capable of rapidly handling a large quantity of meat with the particular meat guiding and positioning features of the machine specifically adapting the machine for use in high speed operations wherein the meat can be quickly taken from a saw table and introduced into the machine with little effort on the part of the saw operator, the meat cleaning machine requiring no attendance other than an occasional emptying of the meat receiving lug or lugs and the scrap receiving containers.

Furthermore, it is a significant object of the instant invention to provide a machine wherein means is specifically provided for positively gripping the individual cuts of meat and moving the meat at a predetermined relatively slow speed along a specific path which insures a proper engagement of the opposed surfaces of the meat by means of a pair of elongated cleaning elements, normally brushes, so as to insure the desired complete cleaning thereof.

Also, it is an important object of the instant invention to provide an automatic meat handling and cleaning machine which is relatively simple in both construction and operation thereby making it easily maintained and capable of substantially trouble-free operation over extended periods of use.

In conjunction with the above object, it is also a significant intention of the instant invention to provide a meat cleaning device which is so constructed and operated as to constitute an important and efficient addition in all operations wherein cuts of meat are produced for subsequent sale and/or use regardless of the volume involved and without affecting the efficiency of the basic operations themselves.

Basically, the machine of the instant invention is to be of a height so as to position the upper receiving end thereof generally level with the platform of a meat cutting saw adjacent which it is to be normally positioned. With such a positioning of the device, the severed cut of meat can be merely moved directly thereinto from the saw itself. The cleaning machine is to in fact be so constructed as to enable the severed cut of meat to be quickly deposited thereinto with substantially no guiding being required on the part of the saw operator. In making this possible the machine of the instant invention includes both a vertical backstop located above two horizontal meat gripping members, and a horizontal conveyor which is opposed from the vertical backstop and also discharges between the meat gripping members. The backstop enables a cut of meat to be literally swung off the saw table and engaged against the backstop, at which point the cut of meat will easily slide vertically into gripped engagement by the gripping members. By the same token, the cut meat can be simply dropped on the conveyor, also for discharge into the gripping members.

Each of the gripping members consists of a series of individual wire rings axially aligned and mounted in spaced relation to each other so as to in effect define an elongated cylinder or cylindrical member. Each of the wire rings defining one of the cylindrical members is driven from a common powered shaft and freely guided both by internal support shafts and external guide rollers. The two cylindrical members are mounted in opposed relation to each other and rotate in opposite directions inwardly and downwardly so as to grip the meat and slowly move the meat vertically downward. One of the cylindrical members is mounted within a spring biased frame section for resilient urging toward the other cylindrical member so as to move outwardly therefrom in a manner which enables the accommodation of cuts of meat of varying thicknesses. Mounted within each of the cylindrical members is an elongated cleaning brush, the periphery of which projects laterally through the spaced rings for engagement with the moving meat, each of the brushes rotating in opposite directions relative to each other and to the corresponding cylindrical meat gripping member so as to effect an upward brushing of the opposed surfaces of the meat. The machine also will include a meat receiving lug located vertically below the brushes and gripping members for the reception of the cleaned cut of meat, and a scrap tray or container located slightly rearward of each of the cleaning brushes below the corresponding gripping member for the reception of the brushed scraps which will be deflected downwardly by an arcuate shield overlying each of the brushes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the automatic meat handling and cleaning machine of the instant invention with a portion thereof broken away for purposes of illustration;

FIGURE 2 is a partial front elevational view of the machine;

FIGURE 3 is a partial rear elevational view of the machine;

FIGURE 4 is a partial cross-sectional view taken substantially on a plane passing along line 4—4 in FIGURE 2;

FIGURE 5 is a partial enlarged cross-sectional view taken substantially on a plane passing along line 5—5 in FIGURE 4;

FIGURE 6 is a partial cross-sectional detail taken substantially on a plane passing along line 6—6 in FIGURE 5;

FIGURE 6A is an illustration of a modified form of the structure of FIGURE 6;

FIGURE 7 is a cross-sectional view through a typical shaft bearing support;

FIGURE 8 is a front elevational view of the structure of FIGURE 7; and

FIGURE 9 is a cross-sectional detail taken substantially on a plane passing along line 9—9 in FIGURE 5.

Referring now more particularly to the drawings, the reference numeral 10 is used to generally designate the machine comprising the instant invention. The machine 10 is to be vertically orientated with the upper receiving end thereof being at approximately the same height of a meat saw table so as to enable each severed cut of meat to be quickly deposited thereinto for a vertical movement therethrough.

The machine 10, caster wheel mounted if so desired for mobility, is to include a rigid framework 12 including a pair of opposed upper sections 14 and 16. Each of the opposed upper sections 14 and 16 includes a pair of inwardly directed front walls 18 and a corresponding pair of inwardly directed rear walls 20, the walls of both pairs terminating in spaced relation to each other along the vertical center of the machine 10. The section 14 is mounted for outward swinging or pivoting relative to the section 16 which is in turn rigid with the frame 12. This outward swinging of the section 14, so as to enable the accommodation of varying thicknesses of cuts of meats between the sections 14 and 16 as shall be described subsequently, is provided for by pivotally mounting depending leg portions 22 of the section 14 to the portion of the subjacent rigid framework by means of pivot pins 24. The outward pivoting of the section 14 is to be resiliently resisted by suitable spring means 26 engaged between the section 14, above one of the pivot pins 24, and the adjacent inward portion of the frame 12. In order to limit the inward swinging of the section 14 toward the section 16 under the influence of the spring means 26, a suitable stop 28 is provided. This stop may consist of an angle member having a vertically projecting leg including a suitable resilient bumper 30 thereon for engagement thereagainst by the inner edge of the section leg 22, noting FIGURE 2 in particular.

Rotatably mounted within each of the upper sections 14 and 16 of the machine 10, and extending transversely between the front and rear walls 18 and 20 thereof adjacent the inner edges, is an elongated wire-like meat gripping cylinder or cylindrical member 32. Each of these cylinders 32, which also might be denoted as rollers, comprises a plurality of coaxial longitudinally spaced rigid wire or rod-like rings 34. These rings 34 are freely retained in parallel spaced relation to each other by means of a plurality of internal support shafts 36 and external guide rollers 38. FIGURE 5 is particularly useful in illustrating the specific relationship between the rings 34, shafts 36 and rollers 38. Each of the rings 34 has the periphery thereof projecting inwardly beyond the inner limit of the corresponding section, either 14 or 16, this inner limit being defined by the edge of the corresponding rear wall 20. This inward projection of the rings 34 will insure a positive engagement with and a gripping of the meat as it is introduced vertically between the sections 14 and 16. Further, so as to both insure a positive gripping of the meat, and facilitate the rotational driving of the rings 34, the outer peripheries thereof are provided with gear teeth 40.

With continued reference to FIGURE 5, as well as FIGURE 6 taken thereon, it will be noted that the internal support shafts 36 underlie an inner segment of the rings 34 in supporting engagement therewith, while the guide rollers 38 overlie the corresponding segment of the rings 34 and engage therewith in a manner so as to guide the rings 34 while maintaining the vertical orientation thereof and the parallel relationship therebetween. These guide rollers 38 will be preferably orientated in parallel spaced relationship between the corresponding support shafts 36. Each of the support shafts 36 consists of an elongated cylindrical rod, while the guide rollers 38 include a plurality of collars 42 which engage directly against the outer toothed periphery of the rings 34 and enlarged annular spacers 44 provided alternately with the collars 42 and functioning so as to retain the individual meat gripping rings 34 therebetween in bearing engagement with the roller collars 42. While the collars 42 and spacers 44 of each of the rollers 38 can possibly be milled from a single shaft, for reasons of economy and practicability, it is contemplated that the collars 42 and spacers 44 be made individually and mounted upon support shafts 46 with the collars 42 and spacers 44 being retained on the corresponding shaft 46 in any suitable manner, such as by individual setscrews 48 or the like. FIGURE 6A is of interest in illustrating a slightly modified form of guide roller 38a wherein the ring engaging collars 42a include a toothed periphery for meshing engagement with the toothed periphery 40 of the rings 34, thereby providing for a more positive engagement with the rings 34.

The meat gripping rings 34 of each of the cylindrical members 32 defined thereby are simultaneously driven in a synchronized manner and as a single unit by means of an associated motor 50 mounted on the rear of the corresponding section 14 or 16. Each of the motors 50 has an elongated drive shaft 52 projecting therefrom in underlying relation to the corresponding aligned rings 34. This motor shaft 52 includes a plurality of drive gears 54 rigidly mounted thereon and spaced from each other by enlarged spacers 56 for engagement with each of the corresponding rings 34 whereby, upon an energization of the motor 50, a rotation of the shaft 52 will effect, through the meshing teeth, a rotation of the associated rings 34. In this manner, all of the meat gripping rings 34 mounted on one of the sections are rotatably driven with the cooperating shafts 36 and guide rollers 38 functioning so as to retain the rings 34 properly orientated. If so desired, rather than providing for individual drive gears 54 affixed to the drive shaft 52 of the corresponding motor and provided intermediate spacers 56, a single elongated drive gear capable of engaging all of the rings 34 along the width of the corresponding section could be utilized. However, the economic advantages of adapting the motor drive shaft 52 to the meat gripping rings 34 as illustrated in the drawings, will be appreciated. It is contemplated that the shafts 36, guide rollers 38 and drive shaft 52 be adjustably mounted so as to insure a proper engagement with the corresponding rings 34, the shafts 36 and 52 and the rollers 38 all having the upper end portions thereof rotatably mounted on the front and rear walls 18 and 20 of the corresponding section, either 14 or 16.

Attention is now directed to FIGURES 7 and 8 wherein a typical mount, common to all of the shafts, including the shafts 36, the roller shafts 46, and the two motor shafts 52, has been illustrated. These mounts, generally designated by reference numeral 58, are provided on both the front and rear walls 18 and 20 of the two sections 14 and 16 for the adjustable and rotatable reception of the corresponding ends of the shafts. For purposes of illustration, the shaft illustrated in FIGURES 7 and 8 has been designated as a support shaft 36. Each of the mounts 58 includes an outwardly projecting flange 60 integral with the corresponding front or rear wall 18 or 20, and an independent upwardly directed U-shaped saddle 62. Each of the saddles 62 is vertically adjustable relative to its corresponding superimposed flange 60 through a pair of vertically extending threaded bolt-like shafts 64 projecting upwardly from the corresponding ends of the legs of the U-shaped saddle 62. These threaded rods or shafts 64 are received through a pair of apertures in the corresponding flange 60 and have nuts 66 threaded on the upper ends thereof, these nuts 66 bearing against the upper surface of the corresponding flange 60. In addition, suitable lock nuts 68 or the like can also be provided for engagement with the undersurface of the corresponding flange 60 thereby fixing the position of the saddle 62 relative to the flange 60. Each saddle 62 in turn has a bearing sleeve 70 adjustably positioned and locked therein by three positioning and locking bolts 72, this bearing or bearing sleeve 70 receiving the end portion of the corresponding shaft 36. Thus, it will be appreciated that the adjacent end of the corresponding shaft can be adjusted utilizing either or both of the positioning and locking bolts 72 and the saddle adjusting threaded rods or bolts 64 in conjunction with the associated nuts 66 and 68. FIGURES 2 and 3 will illustrate the general orientation of the mounting units 58 on the front and rear walls 18 and 20, this arrangement of course corresponding to the positioning of the shafts 36 and rollers 38 as illustrated in FIGURE 5.

Positioned longitudinally through each of the ring defining cylindrical meat gripping members 34 is an elongated meat cleaning brush 74. Each of the brushes 74, preferably defined by spirally oriented bristles 76 upon an elongated hollow central shaft 78, is orientated in a manner whereby the longitudinal periphery thereof projects laterally outward of the corresponding meat gripping cylinder 34 at the vertical center of the machine 10 between the opposed cylinders 34 for engagement with the meat to be moved vertically therethrough. In order to effect a driving of each brush 74, an elongated driven shaft 80 is rotatably mounted, through suitable bearing means 32, on a bearing block 84 which is in turn mounted between upper and lower horizontal tracks 86 affixed to the rear wall 20 of the corresponding section, 14 or 16. The shaft 80 projects through a horizontally elongated slot 88 in the corresponding rear wall 20 and extends transversely across substantially the entire width of the corresponding section to a point adjacent the corresponding front wall 18. The front wall 18 in turn includes an enlarged mounting recess 90 defined therein for easy access to the interior of the corresponding ring defining cylindrical member 34, as well as to the brush 74 which is mounted through a sliding of the hollow central brush shaft 78 over the driven shaft 80 with an appropriate locking cap 92 being affixed, as by a threaded engagement, on the front end of the shaft 80, this being illustrated in FIGURE 4.

The track supported mounting block 84 associated with each brush 74 is provided so as to vary the lateral position of the corresponding brush 74 and the amount of projection of the bristles 76 thereof beyond the corresponding gripping member 34. Each mounting block 84 is provided with a rearwardly projecting internally threaded extension or projection 94 which threadedly receives the externally threaded end of an elongated control rod 96 paralleling the corresponding rear wall 20 and rotatably mounted thereon by a suitable bearing mount 98. Each of the control rods 96 is controlled from the outer end thereof upon which is mounted a handle 100 which can be easily manipulated so as to rotate the control rod 96 in either direction and thereby effect a lateral movement of the corresponding mounting block 84 and the associated brush 74 in the desired direction.

Each of the brushes 74 is to be belt driven off of the motor 50 driving the corresponding meat gripping cylinder 34, and as such, the brush mounting shaft 80 will project rearwardly so as to accommodate a belt pulley 102 about which the belt 104 is engaged, this belt extending over a similar pulley 106 on the motor shaft 52, as well as an idler pulley 108 mounted on an offset shaft 109 which is in turn spring biased so as to maintain a proper tension on the belt 104 throughout the range of adjustment of the corresponding brush 74. It will of course be appreciated that the two brushes 74 are to rotate upwardly and outwardly in opposed directions both to each other and to their corresponding cylindrical meat gripping members 32 which rotate downwardly and inwardly relative to each other. In this manner, a cut of meat is moved along a path downwardly through the machine 10 while the opposed surfaces thereof are brushed upwardly against the direction of movement of the meat, the engagement of the toothed or geared periphery of the rings 34 insuring a positive grip on the meat and a continued movement thereof at a predetermined speed which is contemplated to enable a complete brushing of the surfaces of the meat. The brushes 74 engageable with a cut of meat being guided therepast, are preferably orientated slightly below the horizontal center of the members 32 so as to insure a proper gripping of the meat by the members 32 prior to an engagement of the brushes 74 therewith. The surface accumulation on the meat, including marrow, bone dust, etc., is brushed upwardly and outwardly off the surface of the meat for subsequent discharge from the periphery of the brush to an associated underlying relatively deep scrap tray 110. In order to insure a proper depositing of the scraps in the corresponding tray 110, each section 14 and 16 is provided with an arcuate deflector or shield 112 extending between the corresponding front and rear walls 18 and 20 and affixed thereto by means of screws 114 engaged through inwardly extending mounting ears 116 engaged against the rear wall 20 and outwardly extending mounting ears 118 engaged against the front wall 18 about the arcuate recess 90 defined therein.

With reference to FIGURE 5 it will be noted that the shield 112 associated with each section is positioned entirely within the cylindrical member defined by the rings 34 and underlies the supporting shafts 36 and guiding rollers 38. In addition, an elongated ring cleaning member 120 is affixed along the lower edge of each of the shields or deflectors 112 and includes a plurality of depending teeth 122 which engage between the rings 34 and act so as to remove the meat scraps which might accumulate thereon at a point directly over the corresponding scrap tray 110 and immediately prior to an engagement with the drive shaft gears 54 so as to insure a proper meshing therewith.

Mounted on the spring biased movable section 14 and projecting upwardly therefrom in general alignment with the inner edge thereof is a vertical, or slightly outwardly inclined backstop 124. This backstop 124, of a width substantially equal to the depth of the section 14, is secured to the forward edge of a lid 126 which selectively closes the top of the section 14 for allowing access to the internal elements for cleaning or maintenance purposes. This lid 126 has the outer edge thereof hingedly mounted, as at 128, on the outer or side wall of the section 14 and is maintained closed by a suitable thumb screw 130 or the like clampingly engaged through a depending lug 132 and into the front wall 18 adjacent the inner edge of the section 14. The purpose of this backstop 124 is to position a cut of meat for proper introduction into and between the meat gripping members 32 positioned vertically therebelow. In actual use, a cut of meat will be taken from the saw table and brought into engagement with the backstop 124 and released, the meat subsequently sliding down along the backstop 124 and into the gripping members 32. In fact, in large operations, the meat will more than likely be merely slapped against the backstop 124 and immediately released with this engagement against the backstop 124 also tending to pivot the section 14 slightly outward depending upon the weight of the particular cut of meat thereby facilitating the accommodation of cuts of meat of greater thickness. Once a cut of meat engages against the backstop 124, due to the nature of the meat, it will tend to merely vertically slide off the backstop as noted supra. If so desired, an extension of the backstop 124 can be provided immediately therebelow in the nature of an inner wall 134 extending between the inner edges of the corresponding front and rear walls 18 and 20. However, it will be appreciated that the wall 134, when provided, must terminate above the point where the peripheries of the opposed gripping rings approach each other so as to allow for a clear engagement of the meat therebetween.

The top of the fixed section 16 is relatively low so as to allow clear access to the backstop 124 and it is similarly provided with a hinged lid 136 for allowing limited access to the interior of the section 16 for maintenance purposes. This lid 136 will be hinge mounted as at 138 and selectively locked in position by means of a suitable thumbscrew 140 engaged through a depending ear 142 adjacent the inner edge of the lid 136 and overlying either or both of the walls 18 and 20.

The section 16 is also provided with means for positioning the meat for introduction into the machine 10. This latter means consists of an endless conveyor belt 144 entrained over a pair of rollers 146 and 148. The roller 146 is fixed to a shaft 150 rotatably mounted between a pair of outwardly projecting brackets 152 fixed to the walls 18 and 20, while the roller 148 is fixed to shaft 154 rotatably mounted on the lid 136 adjacent the inner edge thereof in vertically spaced relation above the gripping cylinders 32. The conveyor 144 is continuously driven during the operation of the device by a crossed endless belt 156 engaged over an enlarged pulley 158 mounted on the roller shaft 150 and a reduced pulley 160 mounted on the shaft of the corresponding motor 50. It will of course be appreciated that the relationship between the pulleys 158 and 160 is such so as to effect a relative slow driving of the conveyor 144. The conveyor 144 is particularly useful in positioning small cuts of meat which can be merely dropped thereon for subsequent vertical discharge between the gripping cylinders 32. In this manner, there will be no delay in trying to physically drop the meat through the cylinders 32 such as would tend to slow down large scale meat cutting operations. Incidentally, it should be appreciated that the use of the conveyor 144 is optional.

In actual use, the machine 10 of the instant invention will normally be positioned adjacent the discharge end of a conventional meat saw whereby the user can remove each cut of meat and with substantially no additional effort introduce it into the meat cleaning machine 10. This introduction of the meat can be effected, when smaller cuts of meat are involved, through a dropping of the meat on the conveyor 144 for discharge between the gripping members 32. On the contrary, if so desired, as will normally be the case with larger cuts of meat, the meat can be brought into engagement with the backstop or back wall 124 for a vertical sliding therefrom through the open top of the machine and between the gripping members 32. The forceful engagement of the meat against the backstop 124 will tend to automatically open the corresponding section 14 for the accommodation of the meat between the gripping members. Further, very little accuracy and substantially no waste of time is required in properly positioning the meat through the utilization of the backstop 124. As the meat moves between the gripping members 32, defined by individual peripherally toothed gripping rings 34, the section 14 is biased, through the spring 26, so as to insure a proper grip on the meat. The gripping members 32 act so as to move the meat downwardly past the upwardly rotating and cleaning brushes 74 at a predetermined rate contemplated to insure a complete cleaning of both surfaces of the meat. The brushes themselves are positioned slightly below center within the corresponding cylinders so as to enable a proper gripping of the meat by the cylinders before engagement therewith by the brushes. As the brushes rotate, the removed scraps, bone chips, etc. are discharged rearwardly against the deflector or shield 112 and subsequently discharged into the subjacent scrap trays 110 which, through handles thereon, are removably laterally outward from the corresponding section for emptying. The meat, as it moves past or downwardly below the gripping elements 32, is discharged into a suitable subjacent enlarged meat receiving lug which is removably mounted for emptying. Each of the gripping rings is simultaneously driven with the other gripping rings through a common drive shaft, and is positioned and stabilized through underlying support shafts and overlying guide rollers, the guide rollers being, if so desired, constructed of nylon to facilitate the smooth passage of the gripping rings 34. The cleaning brushes are laterally adjustable toward and away from each other so as to vary the amount of projection of the bristles 76 for engagement with the meat, these brushes in addition being removably mounted upon the corresponding shafts for replacement or cleaning as necessary.

Incidentally, while not specifically illustrated, it will be noted that one contemplated form of brush, other than that illustrated wherein a solid bristle mounting tubular shaft 78 is provided, is one wherein the bristles are secured directly to an elongated spiral metal strip which defines a hollow center for the reception of the drive shaft 80. Further, while the illustrated invention utilizes two motors 50, both simultaneously controlled from a single switch, it should be appreciated that a common power source can be provided for the elements in both sections.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat cleaning machine for receiving and automatically cleaning a cut of meat, said machine including a support structure, meat gripping and moving means movably mounted on said structure for engaging a cut of meat and moving the meat along a specific path through said structure, and means mounted on said structure for engaging and cleaning the meat at it is moved along the path, said gripping and moving means comprising a pair of opposed gripping members in facing relation to each other on opposite sides of said path, the facing portions of said gripping members being movable in a common direction along said path, said cleaning means comprising a pair of cleaning members mounted outward of the facing portions of said gripping members and projecting inward thereof into said path, and means for adjusting the amount of projection of said cleaning members into said path, said opposed gripping members defining elongated cylinders, each of said cylinders comprising a plurality of spaced wire-like elements, and means for simultaneously moving said elements about the longitudinal axis of said cylinder, the elements of each cylinder comprising a plurality of coaxial laterally spaced rings, and means mounting the rings of each cylinder for rotation about their common axis, said means for moving said elements comprising movable drive means directly engaging each of the rings of a cylinder for inducing a rotation thereof.

2. The machine of claim 1 wherein said drive means comprises an elongated rotatably drivable shaft extending longitudinally along the ring defined cylinder and ring engaging means on said shaft at positions therealong corresponding to the location of the rings.

3. The machine of claim 2 wherein said shaft is positioned exteriorly of said rings, the outer periphery of each ring having a rough surface defined thereon for gripping engagement with the meat and for driving engagement with said ring engaging means on said shaft.

4. The machine of claim 3 wherein said means mounting the rings of each cylinder comprises a plurality of elongated support shafts received through the aligned rings and engaged against the inner peripheries thereof.

5. The machine of claim 4 wherein said means mounting the rings of each cylinder further comprises a plurality of elongated guide rollers paralleling the axis of the cylinder and engaged with the outer peripheries of the associated rings.

6. The machine of claim 5 wherein each of said guide rollers comprises a series of enlarged spacers fixed thereon and positioned on the opposed sides of the individual rings for the retention of said rings in spaced relation to each other and in a predetermined orientation so as to define a cylinder.

7. The machine of claim 6 including means for rotatably and adjustably mounting said support shafts and said guide rollers on said support structure.

8. The machine of claim 7 wherein said last mentioned means comprises, at each end of each of said support shafts and guide rollers, a saddle, means adjustably mounting said saddle on said support structure, and a bearing, means adjustably mounting said bearing within said saddle for adjustment both therewith and relative thereto, the corresponding end of a support shaft or guide roller being rotatably received therein.

9. The machine of claim 8 wherein each of said cleaning members comprises an elongated brush extending through the corresponding cylinder and having the bristles thereof projecting laterally through the spaced rings, said means for adjusting the amount of projection comprising an elongated central shaft, a mounting block, bearing means on said block rotatably mounting said brush shaft, and means mounting said block on said supporting structure for an adjustment thereon in a direction laterally of the axis of the brush shaft.

10. The machine of claim 9 including a scrap receiving container removably mounted on said support structure in receiving position below each cylinder and outward of the meat path, and an arcuate deflector extending longitudinally through each ring defined cylinder outward of the brush and inward of the support shafts for the deflection of brush-thrown scraps into the corresponding container.

11. The machine of claim 10 including a plurality of ring cleaning members extending laterally between said rings rearward of the drive shaft along the path of rotation of said rings for the removal of particles collected thereon.

12. The machine of claim 11 including means resiliently biasing one cylinder toward the other for the accommodation of different thickness meat therebetween.

13. The machine of claim 3 wherein said ring engaging means comprise individual gears fixed to the drive shaft, the rough surface defined on the outer periphery of each ring comprising gear teeth meshing with the corresponding drive shaft gear.

14. The machine of claim 1 wherein said means mounting the rings of each cylinder comprises a plurality of elongated support shafts received through the aligned rings and engaged against the inner peripheries thereof, and a plurality of elongated guide rollers paralleling the support shafts and engaged against the outer peripheries of the rings.

15. The machine of claim 14 wherein each of said guide rollers comprises a series of enlarged spacers fixed thereon and positioned on the opposed sides of the individual rings for the retention of said rings in spaced relation to each other and in a predetermined orientation so as to define a cylinder.

References Cited
UNITED STATES PATENTS 2,696,014  12/1954  Richterkessing _____ 15—40
3,102,290   9/1963  Sannes _____ 15—3.17

CHARLES A. WILLMUTH, *Primary Examiner.*

EDWARD L. ROBERTS, *Examiner.*